US008572696B1

(12) United States Patent
Wiacek (10) Patent No.: US 8,572,696 B1
(45) Date of Patent: Oct. 29, 2013

(54) CONTEXTUAL DATA AIDED SECURITY PROTECTION (75) Inventor: Michael Wiacek, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/304,169

(22) Filed: Nov. 23, 2011

(51) Int. Cl.
H04L 29/00 (2006.01)

(52) U.S. Cl.
USPC ............... 726/4; 380/247; 380/248; 380/249; 380/250; 726/27; 713/155; 713/156; 713/157; 713/158; 713/159

(58) Field of Classification Search
USPC .................................................. 713/155–159
See application file for complete search history.

(56) References Cited

U.S. PATENT DOCUMENTS 6,356,935 B1 * 3/2002 Gibbs ........................... 709/206
8,116,291 B2 2/2012 Annamalai et al.
8,286,241 B1 10/2012 Yeo et al.
8,310,361 B1 11/2012 Brewington
8,359,649 B1 1/2013 Sobel et al.
8,363,568 B2 1/2013 Shuster
2007/0130337 A1 6/2007 Arnison
2008/0066188 A1 * 3/2008 Kwak ............................ 726/28
2010/0030858 A1 * 2/2010 Chasin ......................... 709/206
2012/0331069 A1 12/2012 Wieneke et al.

* cited by examiner

Primary Examiner — Ghazal Shehni
(74) Attorney, Agent, or Firm — Fish & Richardson P.C.

(57) ABSTRACT

Methods, systems, and apparatus, including computer programs encoded on a computer storage medium, for providing contextual data aided security protection. In one aspect, a method includes automatically parsing an electronic message associated with a user that includes location information, and extracting the location information from the electronic message. The location information can be added to a database (e.g., white list) associated with the user. The location information in the database can be used to authenticate the user's request for access to electronic mail.

18 Claims, 5 Drawing Sheets

CONTEXTUAL DATA AIDED SECURITY PROTECTION

BACKGROUND

This specification relates to providing security protection that is aided by contextual data. Online account takeover, hijacking, and compromises are an issue for online service providers. One way to address security issues is to establish a white list of IP addresses that are permitted to log into each account. White lists may be used to identify trusted IP addresses or other information used to authenticate user credentials.

SUMMARY

This specification describes technologies relating to providing security protection aided by contextual data analysis.

In general, one innovative aspect of the subject matter described in this specification can be embodied in methods that include the actions of receiving an indication of a change in location information of a user, adding the location information to a database table, and using the location information in the database table to authenticate the user's request for access to a network-based service. Other embodiments of this aspect include corresponding systems, apparatus, and computer programs, configured to perform the actions of the methods, encoded on computer storage devices.

These and other embodiments can each optionally include one or more of the following features. For example, in certain implementations of the embodiments, receiving the indication of the change in the location information of the user may include automatically parsing an electronic message associated with the user that includes the location information, and extracting the location information from the electronic message. The electronic message may be a travel confirmation message. The electronic message may include a signal to update the database table with location information contained within the electronic message. The signal to update the database table with location information contained within the electronic message may be based on authorization provided by the user to include the signal in the electronic message.

In certain implementations, the location information includes an internet protocol address associated with a geographic location.

Certain implementations of the embodiments include receiving the indication of the change in the location information of the user may include receiving an input from the user with the change in the location information.

Certain implementations of the embodiments may include receiving a request to access electronic mail associated with the user from a geographic location other than the user's home location, the indication to access electronic mail including geographic location information and comparing the geographic location information with the location information in the database table. Embodiments may also include identifying location information in the database table that matches the geographic location information and granting the request to access electronic mail based, at least in part, on identifying the matching location information. The location information in the database table may include information about locations visited by other users, and comparing the geographic location information with the location information in the database table may include prioritizing in the database the locations visited by other users for the comparison.

Certain implementations of the embodiments may include prompting the user to verify the change in location information of the user obtained from the received indication. In certain instances, the embodiments may also include identifying a source address of the received indication of the change in location information of the user, and adding the source address to a list of trusted sources.

Certain implementations of the embodiments may include verifying the change in location information by comparing address information associated with the received indication with a list of trusted addresses.

Certain implementations of the embodiments may include identifying a period of time during which the user will be at the location identified in the location information, and updating the white list based on the period of time the user is at the location.

In certain implementations of the embodiments, updating the white list based on the period of time the user is at the location may include removing the location from the white list after an expiration of the period of time.

In general, another aspect of the subject matter described in this specification can be embodied in methods that include the actions of receiving an indication of a change in location information of a user, adding the location information to a database table associated with the user, and using the location information in the database table to authenticate the user's request for access to a network-based service.

In certain embodiments, a system may include a user device, and one or more computers operable to interact with the device. The one or more computers may be operable to receive an indication of a change in location information of a user, adding the location information to a database table associated with the user, using the location information in the database table to authenticate the user's request for access to electronic mail. A server may be operable to interact with the device through a data communication network, and the device is operable to interact with the server as a client. The device may be a personal computer running a web browser, a mobile telephone running a WAP browser, or e-mail client.

Particular embodiments of the subject matter described in this specification can be implemented so as to realize one or more of the following advantages. For example, a user may gain added security for accessing his or her e-mail account from his or her home location or from a remote location. In addition, user access to e-mail while at remote locations can be streamlined such that a user's location credentials can be authenticated automatically, in certain implementations. In another example, particular embodiments of the subject matter described herein may provide protection from access to online services requested from unauthorized locations. For example, if a hacker were to obtain a user name and password for an e-mail account, the system may prevent access to the e-mail account based on the location of the hacker (i.e., the location of the hacker being inconsistent with location information appearing on the white list). A further example advantage could be restricted access of the e-mail account from the user's home location when the user is away from the home location.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Network security techniques may use a white list or other database table to store data that can be used to authenticate a user's credentials. The data stored in the white lists may include internet protocol (IP) addresses that pertain to trusted sources of information, such as trusted user attributes or other indicators of legitimate user identity or behavior. In certain instances, the data may pertain to a geographic location that a user may consider a home location (which may have one or more corresponding IP addresses or a range of addresses). The white list may store location information to provide security for access to e-mail, online accounts, or other network services. For example, a user may request access to e-mail service provided by an e-mail service provider from his or her home office. The e-mail service provider (or e-mail server) can use the IP address associated with the home office to verify the authenticity of the user and/or the user's log-in credentials. An e-mail server may use incoming e-mails addressed to the user or outgoing e-mails from the user to automatically predict where the user will be geographically to permit (or, conversely, deny) e-mail access to the user while the user is outside of his or her home location. Specifically, the e-mail server can parse incoming e-mails for travel information, such as airport codes, hotel names and addresses, flight information, departure and arrival dates, restaurant reservations, meeting requests, etc., to automatically update the white list to provide e-mail access to the user from IP addresses (or other information) matching the geographic location information obtained from the incoming e-mail messages. Other ways of identifying changes in location information may be used. For example, a calendar event may indicate a change in the location of the user (such as a calendar event or invitation for a meeting in a foreign country). In certain instances, the white list can be updated during travel dates to provide further security from requests for e-mail access outside of both the home location and the travel location. For example, travel to New York City from Chicago may establish the inauthenticity of a request for e-mail access from an IP address associated with San Francisco. The following disclosure provides further details and example embodiments of the foregoing general concepts. It is to be understood that the systems, devices, and methods described herein may perform certain operations without compromising the security and privacy of the user's personal information.

Figure 1:
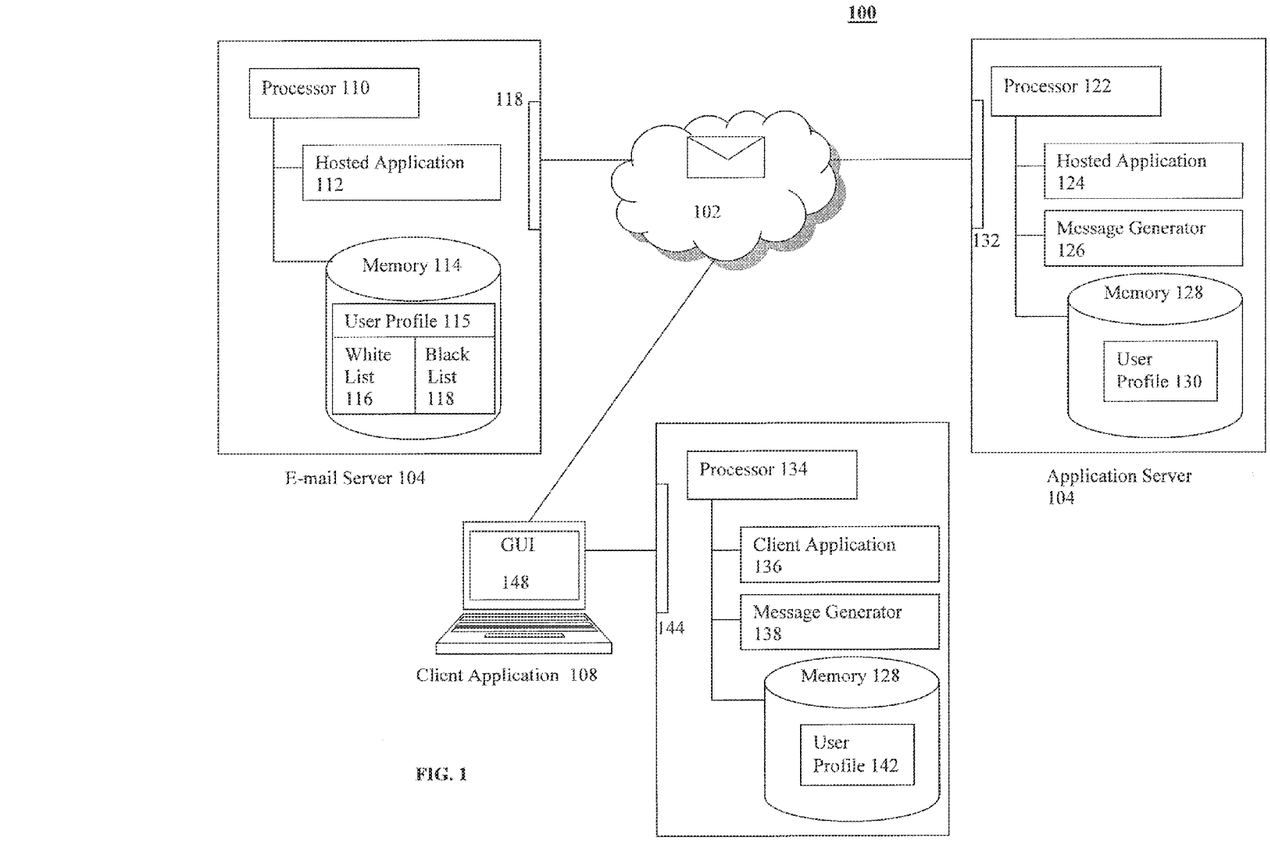
FIG. 1 is a schematic representation of a system for the delivery of e-mail messages through a network.

FIG. 1 is a schematic representation of a system 100 for the delivery of e-mail messages through a network 102 or other computer network. Mail server 104 (having associated source IP addresses) and application servers 106 (having associated destination IP addresses), or other message gateways, allow electronic messages, e.g., electronic mails ("e-mails") to be delivered to and from a client machine 108 and provide other services to users across a network 102.

E-mail messages are typically composed by a user on an application running on a client machine 108. Applications may include an e-mail client application 136 or a web browser 138 or other program providing e-mail functionality to the user. When composition of the message is completed, the application (e.g., in response to the user clicking a "send" button) uploads the completed message to a mail server 104. The mail server 104 may be owned and/or operated by an e-mail service provider or private corporation or internet service provider (ISP). The user client machine 108 connects to the mail server 104 via dial-up, digital subscriber loop (DSL), cable Internet, or by other appropriate means through a network 102. Although only one mail server 104 is depicted and described, the e-mail service may be provided through a server system that includes multiple servers in a server farm and/or geographically distributed servers.

Server 104 may utilize Simple Mail Transport Protocol ("SMTP"), which is a protocol by which e-mail messages can be transported over the Internet. SMTP servers and SMTP clients (SMTP clients are network computers, not to be confused with the client machines 104) provide a mail transport service, and therefore act as Mail Transfer Agents ("MTAs"). Mail User Agents ("MUAs" or "UAs") are normally thought of as the sources and targets of mail.

The SMTP mail transport protocol uses domain names to route messages from a sender to a receiver of e-mail. A distributed database of TCP/IP addresses corresponding to particular domain names is maintained across the network 102 in Domain Name Servers ("DNSs") 108. Thus, to route an e-mail to its destination, the mail servers 104 generally use the address specified by the sending user and inquire of a DNS server 108 the IP address to be assigned to the particular addressed domain name. As used in this specification, an "address" is a character string that identifies a user to whom mail will be sent, a user or source that is sending mail, or a location into which mail will be deposited. The term "mailbox" refers to that depository. The two terms are typically used interchangeably unless the distinction between the location in which mail is placed (the mailbox) and a reference to it (the address) is important. An address normally consists of user and domain specifications; however, addresses may have different forms depending on usage and type of address. The standard mailbox naming convention is defined to be "localpart@domain"; contemporary usage permits a much broader set of applications than simple "user names". The local part of the address is typically interpreted and assigned semantics only by the host specified in the domain part of the address. In contrast, the standard IP address is typically a specific string of numbers identifying a source or destination server.

In general, the server 104 can be any server that stores one or more hosted applications, where at least a portion of the hosted applications 112 are executed via requests and responses sent to users or clients within and communicably coupled to the illustrated environment 100 of FIG. 1. In some instances, the server 104 may store a plurality of various hosted applications 112, while in other instances, the server 104 may be a dedicated server meant to store and execute only a single hosted application 112, such as an e-mail application. In some instances, the server 104 may is a web server, where the hosted application 112 represent one or more web-based applications accessed and executed via network 102 by the client machine 108 of the system to perform the programmed tasks or operations of the hosted application 112. At a high level, the server 104 includes an electronic computing device operable to receive, transmit, process, store, or manage data and information associated with the environment 100. Specifically, the server 104 illustrated in FIG. 1 is responsible for receiving requests from one or more client e-mail applications 136 associated with the client machine 108 of environment 100 and responding to the received requests by processing said requests in the associated hosted application 112, and sending the appropriate response from the hosted application 112 back to the requesting client e-mail application 136. In addition to requests from the external client machine 108 illustrated in FIG. 1, requests associated with the hosted application 112 may also be sent from internal users, external or third-party customers, other automated applications, as well as any other appropriate entities, individuals, systems, or computers.

Mail server 104 may be configured to receive requests for e-mail access from a user operating client machine 108. A user may enter a user name and password and/or other credentials, which the mail server can interpret to determine whether to grant the user access to e-mail. Likewise, the mail server 104 may determine the IP address or other location information from which the user is requesting access. The location may be a geographic location and/or an associated IP address or other unique information of the user's or the client machine 108 location. The location of the user may be used to determine the authenticity of the request for e-mail access and/or the identity of the user. For example, a request that originates from an IP address that is not known or is known to be outside of the user's approved locations may cause the mail server 104 to deny access or to prompt further security questions to verify the validity of the request. Location information may include, but is not limited to, city/state/country information, airport codes, hotel/motel names, addresses, and phone numbers, destination cities, layover cities, conference registration information, rental car information, and other information from which a location (and in some instances, travel duration information) may be identified. Travel confirmation messages may be received from an airline, a hotel, a rental car agency, a travel agent, a travel website, a conference registration, other registration messages, and other providers from which confirmation e-mails may be sent. Other types of electronic messages may be parsed to identify changes in geographic locations, and this disclosure does not limit the type of or source of electronic messages from which location information may be identified.

A user profile 115 may be stored in memory 114. The user profile 115 may include security verification information to verify the user name and password provided by the user. In addition, the memory 114 may store a white list 116 and may store a black list 118 associated with the user profile 115. The white list 116 may be a database table (or other structure or listing technique) and can include a list of IP addresses or other location information that the mail server 104 can use to verify the authenticity of the user and/or the user's request for access to e-mail. The white list 116 may be associated with the user, either directly or indirectly. For example, the user may register with a service to update the white list 116. The user may be indirectly associated with the white list 116, e.g., through another person (e.g., a spouse, parent, etc.). Similarly, the black list 118 may be a database table (or other structure or storage technique) and can be used to store IP addresses or other information pertaining to untrusted sources or locations. The processor 110 can be used to add or remove entries in the white list 116 and the black list 118. The black list 118 may be associated with the user in a similar manner.

Client machine 108 may be a computer. Similarly, the servers 104 and 106 may also be computers. As used in the present disclosure, the term "computer" is intended to encompass any suitable processing device. For example, although FIG. 1 illustrates a single server 104, environment 100 can be implemented using two or more servers, as well as computers other than servers, including a server pool. Indeed, server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 104 may be adapted to execute any operating system, including Linux, UNIX, Windows, Mac OS, or any other suitable operating system. Server 104 may also include or be communicably coupled with a mail server. Server 106 shown in environment 100 is an application server 106 and includes similar elements as e-mail server 104. For example, application server 106 includes an interface 132 that provides input/output functionality to application server 106 to the network 102. One or more processors 122 executes instructions for hosted application 124.

In the present implementation, and as shown in FIG. 1, the server 104 includes a processor 110, an interface 118, a memory 114, and one or more hosted applications 112. The interface 118 is used by the server 104 for communicating with other systems in a client-server or other distributed environment (including within environment 100) connected to the network 102 (e.g., client machine 108, as well as other systems communicably coupled to the network 102). Generally, the interface 118 includes logic encoded in software and/or hardware in a suitable combination and operable to communicate with the network 102. More specifically, the interface 118 can include software supporting one or more communication protocols associated with communications such that the network 102 or interface's hardware is operable to communicate physical signals within and outside of the illustrated environment 100. Similarly, server 106 includes interface 132 and client machine 108 includes interface 144, each of which performs a similar function in a similar way as interface 118.

Generally, the network 102 facilitates wireless or wireline communications between the components of the environment 100 (i.e., between the server 104 and the client machine 108), as well as with any other local or remote computer, such as additional clients, servers, or other devices communicably coupled to network 102 but not illustrated in FIG. 1. The network 102 is illustrated as a single network in FIG. 1, but may be a continuous or discontinuous network, in which at least a portion of the network 102 facilitates communications between senders and recipients. The network 102 may be all or a portion of an enterprise or secured network, while in another instance at least a portion of the network 102 may represent a connection to the Internet. In some instances, a portion of the network 102 may be a virtual private network (VPN), such as, for example, the connection between the client machine 108 and the server 104. Further, all or a portion of the network 102 can comprise either a wireline or wireless link. Example wireless links may include 802.11a/b/g/n, 802.20, WiMax, and/or any other appropriate wireless link. In other words, the network 102 encompasses any internal or external network, networks, sub-network, or combination thereof operable to facilitate communications between various computing components inside and outside the illustrated environment 100. The network 102 may communicate, for example, Internet Protocol (IP) packets, Frame Relay frames, Asynchronous Transfer Mode (ATM) cells, voice, video, data, and other suitable information between network addresses. The network 102 may also include one or more local area networks (LANs), radio access networks (RANs), metropolitan area networks (MANs), wide area networks (WANs), all or a portion of the Internet, and/or any other communication system or systems at one or more locations.

For example, client machine 108 may access mail server 104 across network 102. Similarly, client machine 108 may access application server 106 across network 102. The client machine 108 may provide the user with an interface to access to e-mails stored locally (i.e., in memory 140) or remotely in one or more remote servers. Similarly, client machine 108 may provide the user with an a way to access internet-based applications hosted by application server 106. Hosted applications may include websites for online travel agencies, airlines, hotels, car rental agencies, or other applications that, in certain instances, may create travel information associated with the user. For example, a user operating client machine 108 may access the website of an online travel agent that requires the user to enter a user name and password to access or create a user profile 130. The user profile 130 may be stored on a memory 128 associated with the application server 106. The user may book a flight on the website of the online travel agency, which may send the user a confirmation e-mail. The confirmation e-mail may include certain information about the user's travel plans. For example, the date and time of travel as indicated by on one or more of several example pieces of data, such as flight schedules, hotel reservations, car rental durations, lay-over durations, airport shuttle reservations, etc. One or more destinations may also be indicated, for example, by city/state/country data, airport codes, hotel addresses and/or phone numbers, rental car pick-up and drop-off locations, etc. The confirmation e-mail may be generated by a message generator 126, which may associate the user's travel information with a user profile 130 stored in memory 128 as part of application server 106.

As illustrated in FIG. 1, server 104 includes a processor 110. Although illustrated as a single processor 110 in FIG. 1, two or more processors may be used in embodiments of environment 100. Each processor 110 may be a central processing unit (CPU), a blade, an application specific integrated circuit (ASIC), a field-programmable gate array (FPGA), or another suitable component. Generally, the processor 110 executes instructions and manipulates data to perform the operations of server 104 and, specifically, the one or more plurality of hosted application 112. Specifically, the server's processor 110 executes the functionality required to receive and respond to requests from the client machine 108 and their respective client applications 144, as well as the functionality required to perform the other operations of the hosted application 112. Regardless of the particular implementation, "software" may include computer-readable instructions, firmware, wired or programmed hardware, or any combination thereof stored on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 110 executes one or more hosted application 112 on the server 104. Similarly server 106 includes processor 122 and client machine 108 includes processor 134. Processors 122 and 134 may operate in substantially the same way and perform similar functions as processor 110.

The server 102 also includes memory 114. Memory 114 may include any memory or database module and may take the form of volatile or non-volatile memory including, without limitation, magnetic media, optical media, random access memory (RAM), read-only memory (ROM), removable media, or any other suitable local or remote memory component. Memory 114 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. Additionally, memory 114 may include any other appropriate data, such as VPN applications, firmware logs and policies, firewall policies, a security or access log, print or other reporting files, as well as others. Server 106 includes memory 128 and client machine 108 includes memory 140; each of memory 128 and 140 perform similar functions and in similar ways as memory 114 described above. Client 108 also includes a memory 140 that may be similar to the server's memory 117. Memory 140 may store backup data, parameters, cookies, variables, algorithms, instructions, rules, or references thereto, as well as any other suitable data. As specifically illustrated, memory 140 stores user information 142 associated with a user (though user information may be stored remotely and may be associated with a user upon logging into a profile from a public device). User information 142 may include geographic location information, such as home location and home IP address information.

The illustrated environment of FIG. 1 also includes one or more clients 108. Each client 108 may be any computing device operable to connect to or communicate with at least the server 102 and/or via the network 132 using a wireline or wireless connection. Further, as illustrated by client 108a, each client 108 includes a processor 141, an interface 138, a graphical user interface (GUI) 148, a client application 144, and a memory 147. In general, each client 108 includes an electronic computer device operable to receive, transmit, process, and store any appropriate data associated with the environment 100 of FIG. 1. Any number of clients 108 are associated with, or external to, environment 100. For example, while illustrated environment 100 includes three clients (108a, 108b, and 108c), alternative implementations of environment 100 may include a single client 108 communicably coupled to the server 102, or any other number suitable to the purposes of the environment 100. Additionally, there may also be one or more additional clients 108 external to the illustrated portion of environment 100 that are capable of interacting with the environment 100 via the network 132. Further, the term "client" and "user" may be used interchangeably as appropriate. Moreover, while each client 108 is described in terms of being used by a single user, this disclosure contemplates that many users may use one computer, or that one user may use multiple computers. As used in this disclosure, client 108 is intended to encompass a personal computer, touch screen terminal, workstation, network computer, kiosk, wireless data port, smart phone, personal data assistant (PDA), one or more processors within these or other devices, or any other suitable processing device. For example, each client 108 may include a computer that includes an input device, such as a keypad, touch screen, mouse, or other device that can accept user information, and an output device that conveys information associated with the operation of the server 102 (and hosted application 114) or the client 108 itself, including digital data, visual information, the client application 144, or the GUI 148. Both the input and output device may include fixed or removable storage media including a magnetic storage media, CD-ROM, or other suitable media to both receive input from and provide output to users of the clients 108 through the display, namely, the GUI 148.

Each client 108 may include a client application associated with or that allows access to the hosted application 114. In particular, the client application is any software, such as a web browser or remote portion of the hosted application 114, that allows the client 108 to access and work with the hosted application 114. Particularly, the client application is a software application that enables the client 108 (or a user thereof) to display and interact with one or more of the hosted applications 114 executed at the server 102. Where the hosted applications 114 are web-based applications, the client application may be specific applications dedicated to use with a particular hosted application 114, a general web browser with adequate functionality to interact with the hosted application 114, or any other appropriate software. Client applications may include e-mail application 136 or web browser 128 or other client-run programs.

Further, the illustrated client 108 includes a GUI 148 operable to present information received from, or provide information to, at least a portion of environment 100 for any suitable purpose, including providing a visual representation of programs running the client application 144 (in some instances, the client's web browser). Generally, through the GUI 148, the user is provided with an efficient and user-friendly presentation of data provided by or communicated within the system, including the interactions with the hosted application 114. The term "graphical user interface," or GUI, may be used in the singular or the plural to describe one or more graphical user interfaces and each of the displays of a particular graphical user interface. Therefore, the GUI 148 can represent any graphical user interface, including but not limited to, a web browser, touch screen, or command line interface (CLI) that processes information in environment 100 and efficiently presents the information results to the user. In general, the GUI 148 may include a plurality of user interface (UI) elements, some or all associated with the client application, such as interactive fields, pull-down lists, and buttons operable by the user at client 108. These and other UI elements may be related to or represent the functions of the client application, as well as other software applications executing at the client 108. In particular, the GUI 148 may be used to present the client-based perspective of the hosted application 114, and may be used (e.g., as a web browser or using the client application as a web browser) to view and navigate the hosted application 114, as well as various web pages located both internal and external to the server, some of which may be associated with the hosted application 114. For purposes of the present location, the GUI 148 may be a part of or the entirety of the client application, while also a tool for displaying the visual representation of programs running the client application 136 and hosted applications 114. In some instances, the GUI 148 and the client application 148 may be used interchangeably, particularly when the client application represents a web browser associated with the hosted application 114.

Similar to the server 102, the illustrated clients 108 include both an interface 138 and processor 141. The interface 148 of each client 108 may be similar to the interface 129 of the server 102, in that it may include logic encoded in software and/or hardware in a suitable combination and operable to communicate with the network 132. More specifically, interface 138 may include software supporting one or more communication protocols such that the network 132 or hardware is operable to communicate physical signals to and from the client 108. The client's processor 141 may also be similar in nature to that of the server's processor 111. Again, although only illustrated as a single processor 141, two or more processors may be used in embodiments of environment 100. Similar to the server's processor 111, each client processor 141 may be a central processing unit (CPU), a blade, an application specific integrated circuit (ASIC), a field-programmable gate array (FPGA), or another suitable component. Generally, the processor 141 executes instructions and manipulates data to perform the operations of the client 108 and, specifically, the associated client application described above. Specifically, the client's processor 141 executes the functionality required to send requests from the client 108 and its client application, as well as receive and process the associated responses from the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
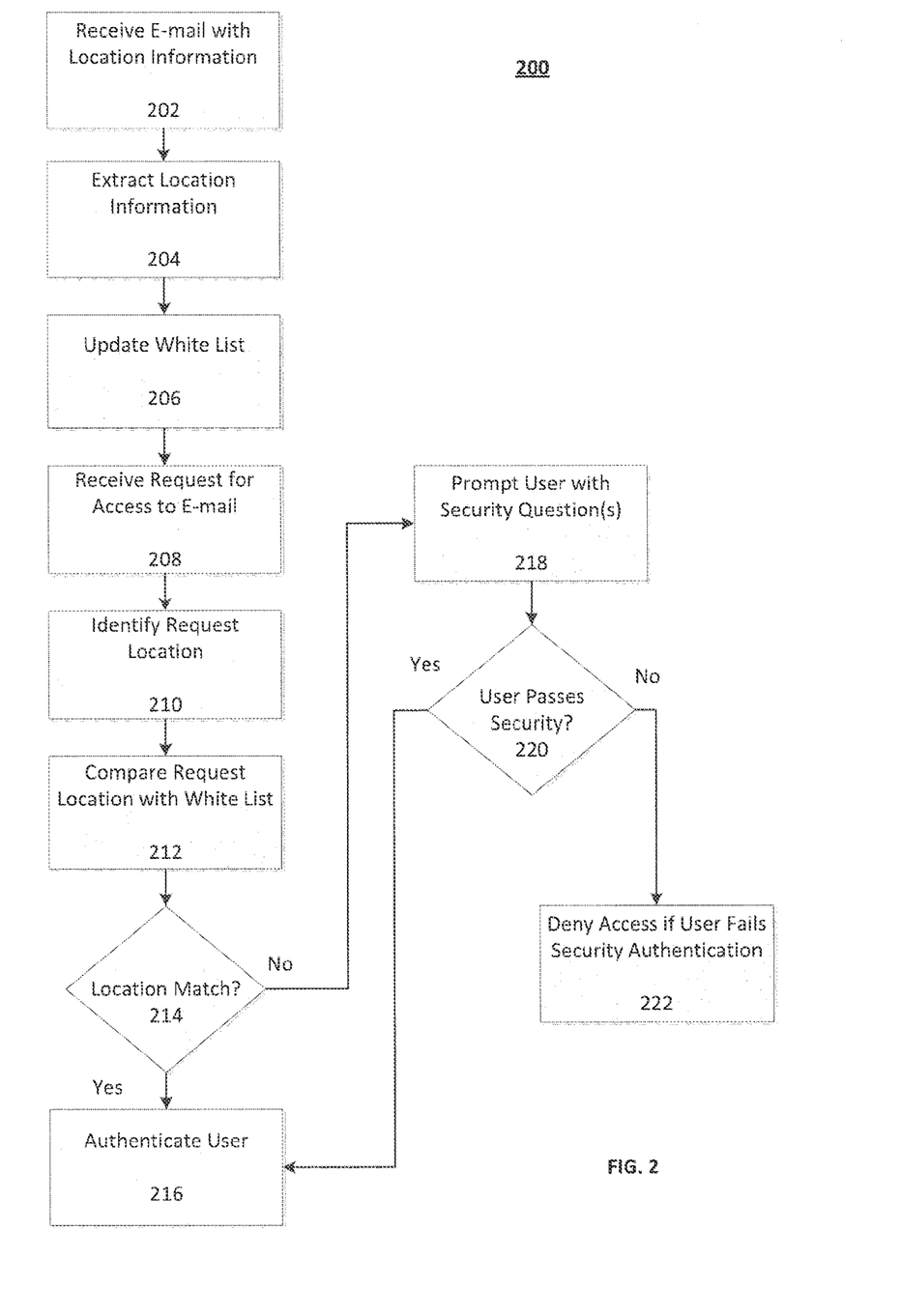
FIG. 2 is an example process flow chart for providing contextual data aided security protection.

FIG. 2 is an example process flow chart 200 for providing contextual data aided security protection. A user (or a mail server used by or associated with the user) may receive an e-mail message that includes an identification of a change in the geographic location of the user at 202. The e-mail message may be received from a third party service provider, such as an airline website, a credit card company, a travel agency, or from other providers. Similarly, the user may send or forward a message with an identification of a change in the geographic location of the user (e.g., the user may send a message to, for example, a friend or to an itinerary management service), which may be received intermediately by the mail server. The location information may include city/state/country, airport codes, hotel addresses, or other geographic location information from which a location may be identified. In addition, the e-mail message may include information that identifies the message as one that includes such location information. The location information may be extracted at 204. In certain instances, the location information may be extracted by the mail server automatically (i.e., without prompting (from) the user). The location information may be added to a white list associated with the user at 206. The white list may be stored as part of the user profile.

The user may then travel to a destination outside of his or her home destination (i.e., a location other than the location designated as a home location based on geographic position and/or IP address). The user may request access to his or her e-mail from that location at 208. The request may be a request to access e-mail from the client machine 108 or from another device. The geographic position of the user when making the request can be identified by the mail server 104 to be different from the user's home location at 210. For example, the IP address from which the user's request originates may be different from the user's home IP address; or, the IP address from which the user's request originates may be associated with a geographic location other than the user's home location. Other ways of determining the location of the user's request can also be used. The location of the user is compared to the white list associated with the user at 212 to determine whether there is a match between the entries on the white list and the originating location of the e-mail access request at 214. If the white list includes location information matching the originating location of the request, then the user's request for access is granted 216. If the white list does not include location information matching the originating location of the request, then the e-mail server may deny access to the request at 222. In certain embodiments, the e-mail server may prompt the user to authenticate his or her identity by answering one or more security questions at 218, the answers of which the e-mail server can verify at 220. If the user can authenticate his or her identity by answering the security questions correctly, then the e-mail server may grant the request to access e-mail at 216. Though described in terms of e-mail implementations, other messaging and internet services may be used.

In certain implementations, previously visited locations can be stored for future use. For example, if a first user, user X, went to Aruba and stayed at a resort, that information could be preserved. Then when a second user, user Y, books a trip to Aruba and stays at the same resort, the system could expect logins from Aruba, but also bias the whitelist to a range of IP addresses that are used by the resort.

Figure 3:
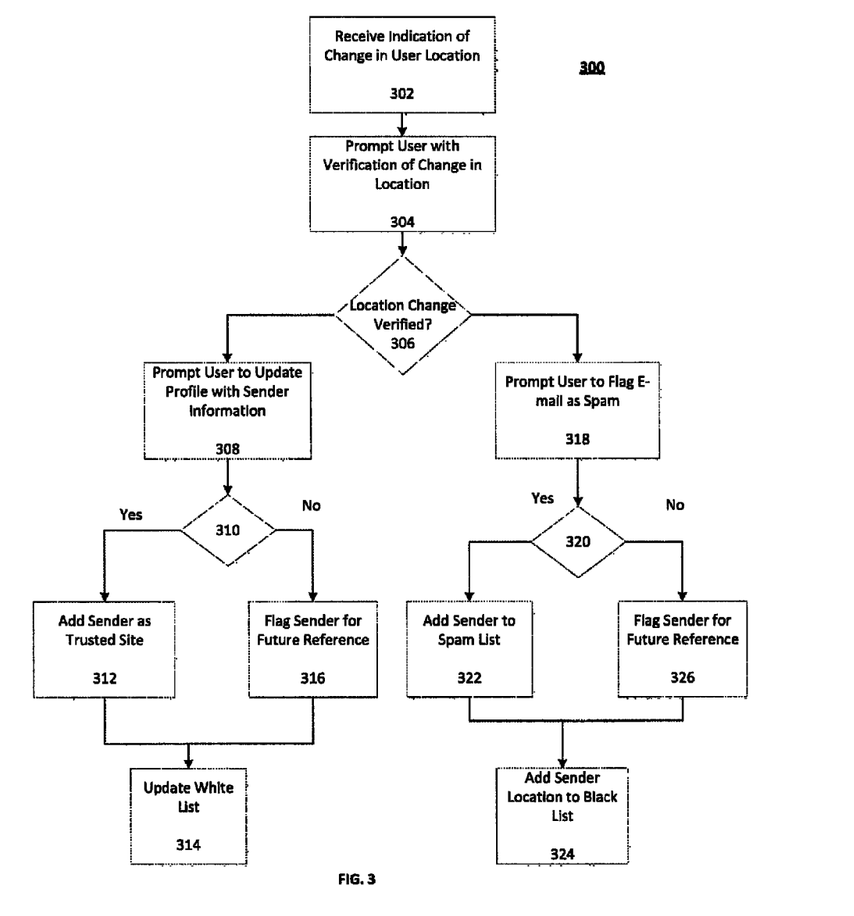
FIG. 3 is an example process flow chart for providing contextual data aided security protection involving user prompts for authentication verification.

FIG. 3 is an example process flow chart 300 for providing contextual data aided security protection involving user prompts for authentication verification. In certain embodiments, the user may be prompted by the e-mail server upon receiving an e-mail having location information whether to update the white list. The user may want such a prompting to avoid false location changes from information in, for example, spam e-mails or other e-mails that include location change information that are not associated with the user (e.g., travel confirmation for another person sent to the user). The e-mail server may receive an e-mail having location information or a change in location information at 302. The server may ask the user whether the location change information is authentic at 304 to verify that the location change is associated with the user at 306. If the user acknowledges that the e-mail message does contain user-associated location change information, then the e-mail server may ask the user whether to update the user profile with information about the sender of the e-mail (e.g., name, IP address, URL, or other identifiers). This acknowledgement step allows the system to anticipate future e-mails from the same sender and automatically update the white list based on location change information contained in e-mail messages sent from this sender. If the user accepts the prompt to update the user profile with the sender information, the server will do so at 312, and then update the white list with the location change information at 314. If the user does not want the server to update his or her profile with the sender information, the e-mail server may disregard the sender information or may flag the sender for future promptings at 316. In either case, the server may update the white list based on the verified location change information in the e-mail message.

If the location change information is not verified by the user, the server may prompt the user to mark the e-mail as spam at 318. If the user agrees, then the server may add the sender to a spam list at 322 and in some embodiments, add the sender's location to the black list (if not on the white list or the user's home location) at 324. As mentioned above, the e-mail message may include valid location change information, but such information may not be for the user. In such a situation, the user may not want the e-mail or the sender marked as spam. In that case, the server may flag the e-mail sender for future reference at 326. In addition, the server may also add the sender's location/IP address to the black list (if not on the white list or the user's home location) at 324. It is to be understood that the server may also prompt the user to verify the location change information, which may be done in any of the several example embodiments described herein.

Figure 4:
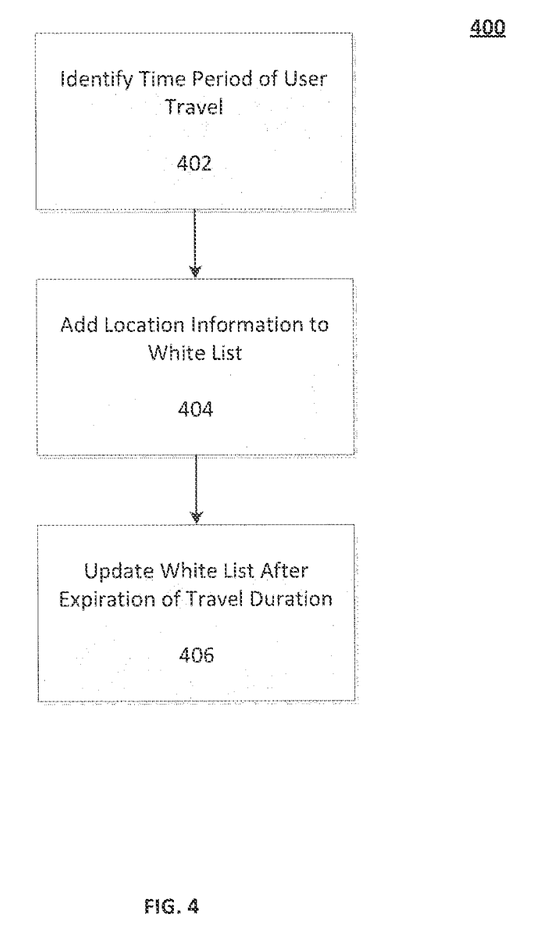
FIG. 4 is an example process flow chart for updating a white list based on travel duration periods.

FIG. 4 is an example process flow chart 400 for updating a white list based on travel duration periods. In certain embodiments, the e-mail message containing the location change information may include sufficient information for the receiving e-mail server to determine a time period during which the user will be at the location(s) identified in the e-mail message. The time periods can be used to dynamically update the white list with location information. For example, the location information may be added to the white list at the start of the time period and then be removed from the white list at the expiration of the time period. Such dynamic updating can be done automatically (i.e., without prompting (from) the user, though, in general, the system may prompt the user for white list updates). The server may identify a time period during which the user will be at the new location at 402. The location information can be added to the white list at 404. This step can be performed immediately (or immediately upon confirmation) or it can be performed at the start of the user's trip to the new location. The white list can be updated again after the expiration of the time period at 406. In certain instances, the user may have several legs to his or her journey. The white list can be updated dynamically based on the time period the user spends at each leg of the journey. In addition, the home location can also be added to the black list while the user is away from home for further security. In some cases by use of technology such as DKIM or pgp, the server may be able to automatically verify the validity of incoming messages without the user taking any action.

Figure 5:
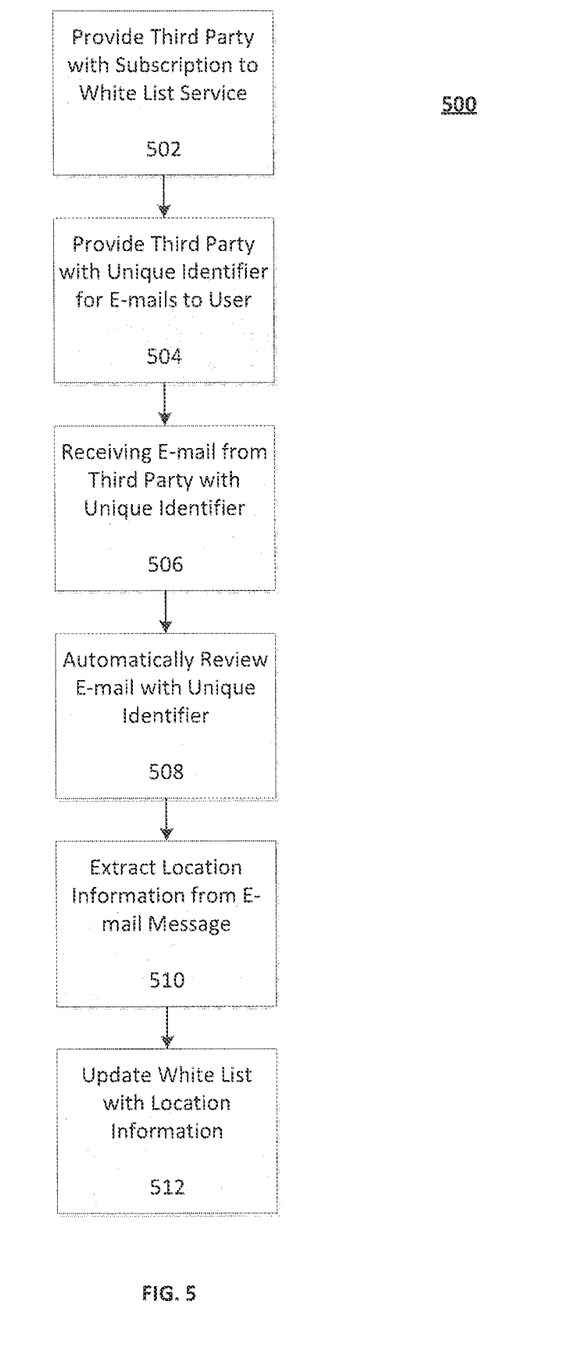
FIG. 5 is an example process flow chart for providing third party service providers with authentication credentials for contextual data aided security protection.

FIG. 5 is an example process flow chart 500 for providing third party service providers with authentication credentials for contextual data aided security protection in accordance with the present disclosure. In certain embodiments, the e-mail server or the user may provide the third party service provider a subscription to the white list service at 502. For example, the user may establish a relationship between the service provider and the e-mail server such that e-mail messages with location change information sent from the service provider can be automatically flagged and parsed for location change information. In certain embodiments, when a relationship is established, the e-mail server may provide the service provider with a unique identifier for the user at 504. The unique identifier may be attached to e-mails having location change information that are sent to the user (through the e-mail server) at 506. The e-mail server can identify a potential location change e-mail by the e-mail address of the message and parse the message for the unique identifier at 508. E-mails having the unique identifier may be understood to contain location information. Therefore, the e-mail server can update the white list without further prompting from the user. The location information may be extracted from the e-mail message at 510. The white list may then be updated with the location information at 512.

Location change information may be provided to third parties as a service. For example, third party companies can "buy" location information from the providers of the online services (e.g., e-mail service provider). The release of location information would be approved of by the user. For example, a credit card company may prompt the user to sign-up for a service where location information from e-mail messages may be shared with the credit card company. The credit card company can then purchase location information for, e.g., its own security service. That is, the location information may allow the credit card company to identify possible fraudulent purchases made from "unauthorized" locations, which are determined based on the location information received from the service provider. The credit card company can receive the specific location information from the e-mail messages and establish its own white/black lists, or may receive the white/black list from the online service provider.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. A computer program (or computer program product) may be tangibly embodied on a non-transient medium.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as e-mail server 104, or that includes a middleware component, e.g., an application server 106, or that includes a front-end component, e.g., a client computer (e.g., client machine 108) having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. The embodiments described herein may be performed either separately or in combination with one another.

What is claimed is:

1. A method performed by a data processing apparatus, the method comprising:
   automatically and independent of receiving a search request, parsing an electronic message associated with a user account;
   determining a future change in geographic location of an authorized user of the user account based on geographic location information in the electronic message;
   adding, to a database of authorized access locations for the user account, a new location based on the future change in geographic location;
   receiving a request for access to a network-based service associated with the user account;
   comparing an origin of the request to the database of authorized access locations;
   identifying a match between the origin of the request and the new location; and
   granting access to the network-based service based on identifying the match.

2. The method of claim 1, comprising:
   receiving access credentials; and
   determining whether to grant access based on the access credentials and the geographic location information in the database of authorized access locations.

3. The method of claim 1, wherein the electronic message is a travel confirmation message.

4. The method of claim 1, wherein the electronic message includes a signal to update the database of authorized access locations with the geographic location information contained within the electronic message.

5. The method of claim 4, wherein the signal to update the database of authorized access locations with the geographic location information contained within the electronic message is based on authorization provided by the user to include the signal in the electronic message.

6. The method of claim 1, wherein the geographic location information includes an internet protocol address associated with a geographic location.

7. The method of claim 1 wherein the request for access to the network-based service is a request to access electronic mail from a geographic location other than a home location of the authorized user, and the request to access electronic mail includes geographic location information indicating the origin.

8. The method of claim 7 wherein the database of authorized access locations includes information about locations visited by other users, and the comparing includes prioritizing, in the database of authorized access locations, the locations visited by other users.

9. The method of claim 1 further comprising prompting the user to verify the future change.

10. The method of claim 9 further comprising identifying a source address of the geographic location information in the electronic message; and adding the source address to a list of trusted sources.

11. The method of claim 1 further comprising verifying the future change in geographic location based on a comparison with a list of trusted addresses.

12. The method of claim 1 further comprising identifying a period of time during which the authorized user will be at the new location, and updating the database of authorized access locations based on the identified period of time.

13. The method of claim 12, comprising removing the new location from the database of authorized access locations after an expiration of the identified period of time.

14. A non-transient computer storage medium encoded with a computer program, the computer program comprising instructions that when executed by data processing apparatus cause the data processing apparatus to perform operations comprising:

automatically and independent of receiving a search request, parsing an electronic message associated with a user account;

determining a future change in geographic location of an authorized user of the user account based on geographic location information in the electronic message;

adding, to a database of authorized access locations for the user account, a new location based on the future change in geographic location;

receiving a request for access to a network-based service associated with the user account;

comparing an origin of the request to the database of authorized access locations;

identifying a match between the origin of the request and the new location; and granting access to the network-based service based on identifying the match.

15. A system comprising:

a user device; and one or more computers configured to interact with the user device and to:

automatically and independent of receiving a search request, parse an electronic message associated with a user account;

determine a future change in geographic location of an authorized user of the user account based on geographic location information in the electronic message;

add, to a database of authorized access locations for the user account, a new location based on the future change in geographic location;

receive a request for access to a network-based service associated with the user account;

compare an origin of the request to the database of authorized access locations;

identify a match between the origin of the request and the new location; and grant access to the network-based service based on identifying the match.

16. The system of claim 15, wherein the one or more computers comprise a server configured to interact with the user device through a data communication network, and the user device is configured to interact with the server as a client.

17. The system of claim 16, wherein the user device comprises a personal computer running a web browser, or a mobile telephone running a WAP browser or an e-mail client.

18. The system of claim 15, wherein the one or more computers comprises one computer, the user device is a user interface of the one computer.

\* \* \* \* \*